US012164480B2

(12) United States Patent
Natanzon et al.

(10) Patent No.: US 12,164,480 B2
(45) Date of Patent: Dec. 10, 2024

(54) OPTIMIZING FILE SYSTEM DEFRAG FOR DEDUPLICATED BLOCK STORAGE

(71) Applicant: EMC IP Holding Company LLC, Hopkinton, MA (US)

(72) Inventors: Assaf Natanzon, Tel Aviv (IL); Zvi Schneider, Tel Aviv (IL); Amitai Alkalay, Kadima (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 378 days.

(21) Appl. No.: 16/368,008

(22) Filed: Mar. 28, 2019

(65) Prior Publication Data
US 2020/0311030 A1    Oct. 1, 2020

(51) Int. Cl.
*G06F 16/174* (2019.01)
*G06F 16/17* (2019.01)

(52) U.S. Cl.
CPC ...... *G06F 16/1752* (2019.01); *G06F 16/1724* (2019.01)

(58) Field of Classification Search
CPC ............. G06F 16/1752; G06F 16/1724; G06F 16/1754
See application file for complete search history.

(56) References Cited

U.S. PATENT DOCUMENTS

| 7,203,741 B2 | 4/2007 | Marco et al. |
| 7,567,188 B1 | 7/2009 | Anglin et al. |
| 7,719,443 B1 | 5/2010 | Natanzon |
| 7,840,536 B1 | 11/2010 | Ahal et al. |
| 7,840,662 B1 | 11/2010 | Natanzon |
| 7,844,856 B1 | 11/2010 | Ahal et al. |
| 7,860,836 B1 | 12/2010 | Natanzon et al. |
| 7,882,286 B1 | 2/2011 | Natanzon et al. |
| 7,934,262 B1 | 4/2011 | Natanzon et al. |
| 7,958,372 B1 | 6/2011 | Natanzon |
| 8,037,162 B2 | 10/2011 | Marco et al. |
| 8,041,940 B1 | 10/2011 | Natanzon et al. |
| 8,060,713 B1 | 11/2011 | Natanzon |
| 8,060,714 B1 | 11/2011 | Natanzon |
| 8,103,937 B1 | 1/2012 | Natanzon et al. |

(Continued)

OTHER PUBLICATIONS

Non Final Office Action dated Jun. 15, 2020, U.S. Appl. No. 16/261,174, 36 pages.

(Continued)

*Primary Examiner* — Pierre M Vital
*Assistant Examiner* — Jedidiah P Ferrer
(74) *Attorney, Agent, or Firm* — DALY, CROWLEY, MOFFORD & DURKEE, LLP

(57) ABSTRACT

A method for data defragmentation is disclosed, including: selecting a file that is stored in a content-addressable storage system, the file including a plurality of blocks, and the storage system including a plurality of deduplication chunks; arranging the plurality of blocks in block groups, each block group including a set of consecutive blocks having a combined size that matches a deduplication chunk size of the storage system; aligning each block group with a different one of the plurality of deduplication chunks of the storage system, such that the blocks in each block group are stored in the storage system in an order that is based on the order in which the blocks are positioned within the file.

14 Claims, 10 Drawing Sheets

(56) References Cited

U.S. PATENT DOCUMENTS

| | | |
|---|---|---|
| 8,108,634 B1 | 1/2012 | Natanzon et al. |
| 8,214,612 B1 | 7/2012 | Natanzon |
| 8,250,149 B2 | 8/2012 | Marco et al. |
| 8,271,441 B1 | 9/2012 | Natanzon |
| 8,271,447 B1 | 9/2012 | Natanzon et al. |
| 8,332,687 B1 | 12/2012 | Natanzon et al. |
| 8,335,761 B1 | 12/2012 | Natanzon |
| 8,335,771 B1 | 12/2012 | Natanzon et al. |
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,407,438 B1 * | 3/2013 | Ranade ............... G06F 3/0683 711/206 |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,032 B2 | 7/2013 | Anglin et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,639,899 B2 | 1/2014 | Kawakami et al. |
| 8,682,870 B1 * | 3/2014 | Gardner ............... G06F 11/1469 707/692 |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,788,466 B2 | 7/2014 | Anglin et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,943,032 B1 * | 1/2015 | Xu ....................... G06F 16/119 707/698 |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | BenHanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |
| 9,582,382 B1 | 2/2017 | Natanzon et al. |
| 9,588,703 B1 | 3/2017 | Natanzon et al. |
| 9,588,847 B1 | 3/2017 | Natanzon et al. |

(56) References Cited

U.S. PATENT DOCUMENTS

| | | |
|---|---|---|
| 9,594,822 B1 | 3/2017 | Natanzon et al. |
| 9,600,377 B1 | 3/2017 | Cohen et al. |
| 9,619,543 B1 | 4/2017 | Natanzon et al. |
| 9,632,881 B1 | 4/2017 | Natanzon |
| 9,665,305 B1 | 5/2017 | Natanzon et al. |
| 9,710,177 B1 | 7/2017 | Natanzon |
| 9,720,596 B1 * | 8/2017 | Bono .................. G06F 3/064 |
| 9,720,618 B1 | 8/2017 | Panidis et al. |
| 9,722,788 B1 | 8/2017 | Natanzon et al. |
| 9,727,429 B1 | 8/2017 | Moore et al. |
| 9,733,969 B2 | 8/2017 | Derbeko et al. |
| 9,737,111 B2 | 8/2017 | Lustik |
| 9,740,572 B1 | 8/2017 | Natanzon et al. |
| 9,740,573 B1 | 8/2017 | Natanzon |
| 9,740,880 B1 | 8/2017 | Natanzon et al. |
| 9,749,300 B1 | 8/2017 | Cale et al. |
| 9,772,789 B1 | 9/2017 | Natanzon et al. |
| 9,798,472 B1 | 10/2017 | Natanzon et al. |
| 9,798,490 B1 | 10/2017 | Natanzon |
| 9,804,934 B1 | 10/2017 | Natanzon et al. |
| 9,811,431 B1 | 11/2017 | Natanzon et al. |
| 9,823,865 B1 | 11/2017 | Natanzon et al. |
| 9,823,973 B1 | 11/2017 | Natanzon |
| 9,832,261 B2 | 11/2017 | Don et al. |
| 9,846,698 B1 | 12/2017 | Panidis et al. |
| 9,875,042 B1 | 1/2018 | Natanzon et al. |
| 9,875,162 B1 | 1/2018 | Panidis et al. |
| 9,880,777 B1 | 1/2018 | Bono et al. |
| 9,881,014 B1 | 1/2018 | Bono et al. |
| 9,910,620 B1 | 3/2018 | Veprinsky et al. |
| 9,910,621 B1 | 3/2018 | Golan et al. |
| 9,910,735 B1 | 3/2018 | Natanzon |
| 9,910,739 B1 | 3/2018 | Natanzon et al. |
| 9,917,854 B2 | 3/2018 | Natanzon et al. |
| 9,921,955 B1 | 3/2018 | Derbeko et al. |
| 9,933,957 B1 | 4/2018 | Cohen et al. |
| 9,934,302 B1 | 4/2018 | Cohen et al. |
| 9,940,205 B2 | 4/2018 | Natanzon |
| 9,940,460 B1 | 4/2018 | Derbeko et al. |
| 9,946,649 B1 | 4/2018 | Natanzon et al. |
| 9,959,061 B1 | 5/2018 | Natanzon et al. |
| 9,965,306 B1 | 5/2018 | Natanzon et al. |
| 9,990,256 B1 | 6/2018 | Natanzon |
| 9,996,539 B1 | 6/2018 | Natanzon |
| 10,001,942 B1 | 6/2018 | Sharma et al. |
| 10,007,626 B1 | 6/2018 | Saad et al. |
| 10,019,194 B1 | 7/2018 | Baruch et al. |
| 10,025,931 B1 | 7/2018 | Natanzon et al. |
| 10,031,675 B1 | 7/2018 | Veprinsky et al. |
| 10,031,690 B1 | 7/2018 | Panidis et al. |
| 10,031,692 B2 | 7/2018 | Elron et al. |
| 10,031,703 B1 | 7/2018 | Natanzon et al. |
| 10,037,251 B1 | 7/2018 | Bono et al. |
| 10,042,579 B1 | 8/2018 | Natanzon |
| 10,042,751 B1 | 8/2018 | Veprinsky et al. |
| 10,055,146 B1 | 8/2018 | Natanzon et al. |
| 10,055,148 B1 | 8/2018 | Natanzon et al. |
| 10,061,666 B1 | 8/2018 | Natanzon et al. |
| 10,067,694 B1 | 9/2018 | Natanzon et al. |
| 10,067,837 B1 | 9/2018 | Natanzon et al. |
| 10,078,459 B1 | 9/2018 | Natanzon et al. |
| 10,082,980 B1 | 9/2018 | Cohen et al. |
| 10,083,093 B1 | 9/2018 | Natanzon et al. |
| 10,095,489 B1 | 10/2018 | Liberman et al. |
| 10,101,943 B1 | 10/2018 | Ayzenberg et al. |
| 10,108,356 B1 | 10/2018 | Natanzon et al. |
| 10,108,507 B1 | 10/2018 | Natanzon |
| 10,108,645 B1 | 10/2018 | Bigman et al. |
| 10,114,581 B1 | 10/2018 | Natanzon et al. |
| 10,120,787 B1 | 11/2018 | Shemer et al. |
| 10,120,925 B1 | 11/2018 | Natanzon et al. |
| 10,126,946 B1 | 11/2018 | Natanzon et al. |
| 10,133,874 B1 | 11/2018 | Natanzon et al. |
| 10,140,039 B1 | 11/2018 | Baruch et al. |
| 10,146,436 B1 | 12/2018 | Natanzon et al. |
| 10,146,639 B1 | 12/2018 | Natanzon et al. |
| 10,146,675 B1 | 12/2018 | Shemer et al. |
| 10,146,961 B1 | 12/2018 | Baruch et al. |
| 10,148,751 B1 | 12/2018 | Natanzon |
| 10,152,246 B1 | 12/2018 | Lieberman et al. |
| 10,152,267 B1 | 12/2018 | Ayzenberg et al. |
| 10,152,384 B1 | 12/2018 | Amit et al. |
| 10,157,014 B1 | 12/2018 | Panidis et al. |
| 10,158,483 B1 * | 12/2018 | Newman .............. G06F 16/1752 |
| 10,185,583 B1 | 1/2019 | Natanzon et al. |
| 10,191,677 B1 | 1/2019 | Natanzon et al. |
| 10,191,687 B1 | 1/2019 | Baruch et al. |
| 10,191,755 B1 | 1/2019 | Natanzon et al. |
| 10,203,904 B1 | 2/2019 | Natanzon et al. |
| 10,210,073 B1 | 2/2019 | Baruch et al. |
| 10,223,007 B1 | 3/2019 | Natanzon et al. |
| 10,223,023 B1 | 3/2019 | Natanzon et al. |
| 10,223,131 B1 | 3/2019 | Lieberman et al. |
| 10,229,006 B1 | 3/2019 | Natanzon et al. |
| 10,229,056 B1 | 3/2019 | Panidis et al. |
| 10,235,055 B1 | 3/2019 | Saad et al. |
| 10,235,060 B1 | 3/2019 | Baruch et al. |
| 10,235,061 B1 | 3/2019 | Natanzon et al. |
| 10,235,064 B1 | 3/2019 | Natanzon et al. |
| 10,235,087 B1 | 3/2019 | Baruch et al. |
| 10,235,088 B1 | 3/2019 | Baruch et al. |
| 10,235,090 B1 | 3/2019 | Baruch et al. |
| 10,235,091 B1 | 3/2019 | Ayzenberg et al. |
| 10,235,092 B1 | 3/2019 | Natanzon et al. |
| 10,235,145 B1 | 3/2019 | Natanzon et al. |
| 10,235,196 B1 | 3/2019 | Natanzon et al. |
| 10,235,247 B1 | 3/2019 | Natanzon et al. |
| 10,235,249 B1 | 3/2019 | Natanzon et al. |
| 10,235,252 B1 | 3/2019 | Lieberman et al. |
| 10,250,679 B1 | 4/2019 | Natanzon et al. |
| 10,255,137 B1 | 4/2019 | Panidis et al. |
| 10,255,291 B1 | 4/2019 | Natanzon et al. |
| 10,496,314 B2 | 12/2019 | Sharma et al. |
| 2010/0036887 A1 | 2/2010 | Anglin et al. |
| 2010/0082558 A1 | 4/2010 | Anglin et al. |
| 2011/0131390 A1 | 6/2011 | Srinivasan et al. |
| 2012/0131025 A1 * | 5/2012 | Cheung .............. G06F 16/1752 707/755 |
| 2012/0233417 A1 * | 9/2012 | Kalach ................ G06F 11/1453 711/E12.103 |
| 2014/0115182 A1 * | 4/2014 | Sabaa ................ H04L 67/1097 709/232 |
| 2015/0026135 A1 * | 1/2015 | Aronovich .......... G06F 16/1752 707/692 |
| 2015/0234710 A1 * | 8/2015 | Berrington .......... G06F 16/1752 707/664 |
| 2018/0173449 A1 | 6/2018 | Sharma et al. |
| 2018/0181339 A1 | 6/2018 | Sharma et al. |
| 2018/0349054 A1 * | 12/2018 | AlAwfi ............... G06F 16/1748 |

OTHER PUBLICATIONS

Response to Office Action filed on Feb. 9, 2021 for U.S. Appl. No. 16/261,174; 13 pages.
U.S. Appl. No. 14/496,783, filed Sep. 25, 2014, Natanzon et al.
U.S. Appl. No. 14/496,790, filed Sep. 25, 2014, Cohen et al.
U.S. Appl. No. 14/559,036, filed Dec. 3, 2014, Natanzon et al.
U.S. Appl. No. 14/753,389, filed Jun. 29, 2015, Nir et al.
U.S. Appl. No. 14/976,719, filed Dec. 21, 2015, Natanzon.
U.S. Appl. No. 14/978,378, filed Dec. 22, 2015, Bigman et al.
U.S. Appl. No. 15/085,148, filed Mar. 30, 2016, Baruch et al.
U.S. Appl. No. 15/274,362, filed Sep. 23, 2016, Baruch et al.
U.S. Appl. No. 15/275,768, filed Sep. 26, 2016, Natanzon et al.
U.S. Appl. No. 15/275,756, filed Sep. 26, 2016, Natanzon et al.
U.S. Appl. No. 15/379,940, filed Dec. 15, 2016, Baruch et al.
U.S. Appl. No. 15/386,754, filed Dec. 21, 2016, Shemer et al.
U.S. Appl. No. 15/380,013, filed Dec. 15, 2016, Baruch et al.
U.S. Appl. No. 15/390,996, filed Dec. 27, 2016, Natanzon et al.
U.S. Appl. No. 15/391,030, filed Dec. 27, 2016, Shemer et al.
U.S. Appl. No. 15/970,243, filed May 3, 2018, Schneider et al.
U.S. Appl. No. 16/052,037, filed Aug. 1, 2018, Schneider et al.

(56) References Cited

OTHER PUBLICATIONS

U.S. Appl. No. 16/048,763, filed Jul. 30, 2018, Schneider et al.
U.S. Appl. No. 16/050,400, filed Jul. 31, 2018, Alkalay et al.
U.S. Appl. No. 16/179,295, filed Nov. 2, 2018, Natanzon et al.
U.S. Appl. No. 16/261,174, filed Jan. 29, 2019, Natanzon et al.
Final Office Action dated Nov. 12, 2020 for U.S. Appl. No. 16/261,174; 26 pages.
Response to Office Action filed on Sep. 8, 2020 for U.S. Appl. No. 16/261,174; 14 pages.
Supplemental Response filed on Mar. 10, 2021 for U.S. Appl. No. 16/261,174; 15 pages.
Notice of Allowance dated May 11, 2021 for U.S. Appl. No. 16/261,174; 10 Pages.

\* cited by examiner

<BEFORE DEFRAGMENTATION>

<AFTER DEFRAGMENTATION>

800

OPTIMIZING FILE SYSTEM DEFRAG FOR DEDUPLICATED BLOCK STORAGE

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

A method for data defragmentation is disclosed, including: selecting a file that is stored in a content-addressable storage system, the file including a plurality of blocks, and the storage system including a plurality of deduplication chunks; arranging the plurality of blocks in block groups, each block group including a set of consecutive blocks having a combined size that matches a deduplication chunk size of the storage system; aligning each block group with a different one of the plurality of deduplication chunks of the storage system, such that the blocks in each block group are stored in the storage system in an order that is based on the order in which the blocks are positioned within the file.

A method for data defragmentation is disclosed, including: selecting a file that is stored in a content-addressable storage system, the file including a plurality of blocks, and the storage system including a plurality of deduplication chunks; arranging the plurality of blocks in block groups, each block group including a set of consecutive blocks having a combined size that matches a deduplication chunk size of the storage system; aligning each block group with a different one of the plurality of deduplication chunks of the storage system, such that the blocks in each block group are stored in the storage system in an order that is based on the order in which the blocks are positioned within the file.

A method for data defragmentation is disclosed, including: selecting a file that is stored in a content-addressable storage system, the file including a plurality of blocks, and the storage system including a plurality of deduplication chunks; arranging the plurality of blocks in block groups, each block group including a set of consecutive blocks having a combined size that matches a deduplication chunk size of the storage system; aligning each block group with a different one of the plurality of deduplication chunks of the storage system, such that the blocks in each block group are stored in the storage system in an order that is based on the order in which the blocks are positioned within the file.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1A:
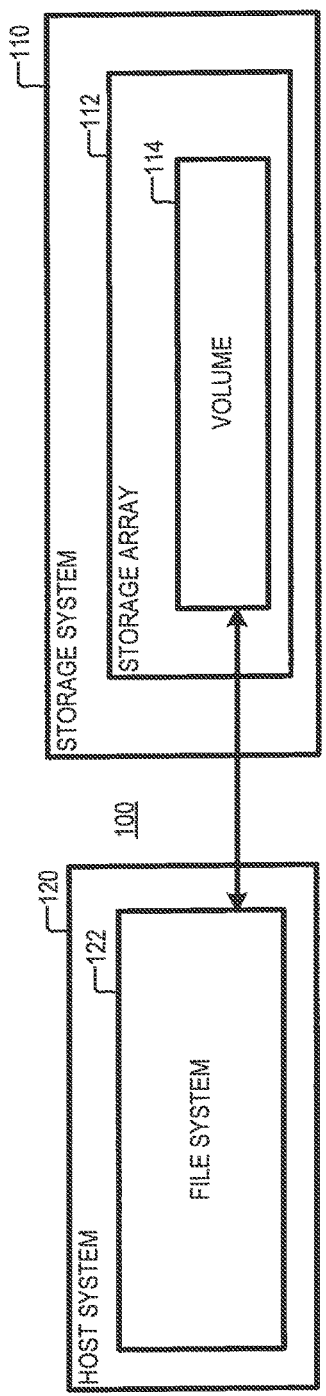
FIG. 1A is a diagram of an example of a system, according to aspects of the disclosure.
Figure 1B:
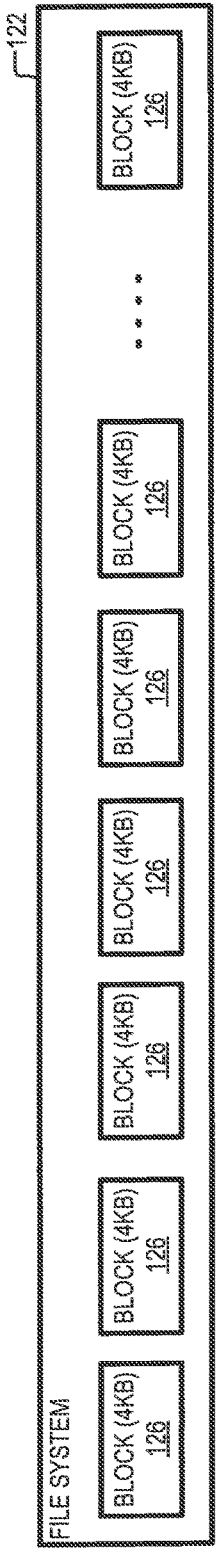
FIG. 1B is a diagram of an example of a file system, according to aspects of the disclosure.
Figure 1C:
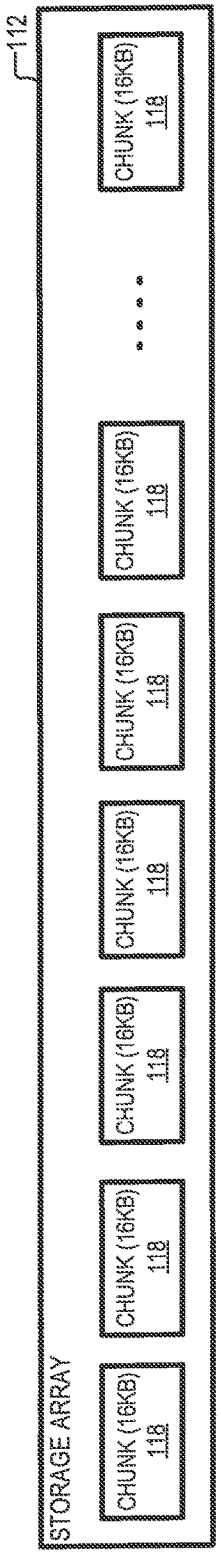
FIG. 1C is a diagram of an example of a storage array, according to aspects of the disclosure.
Figure 8:
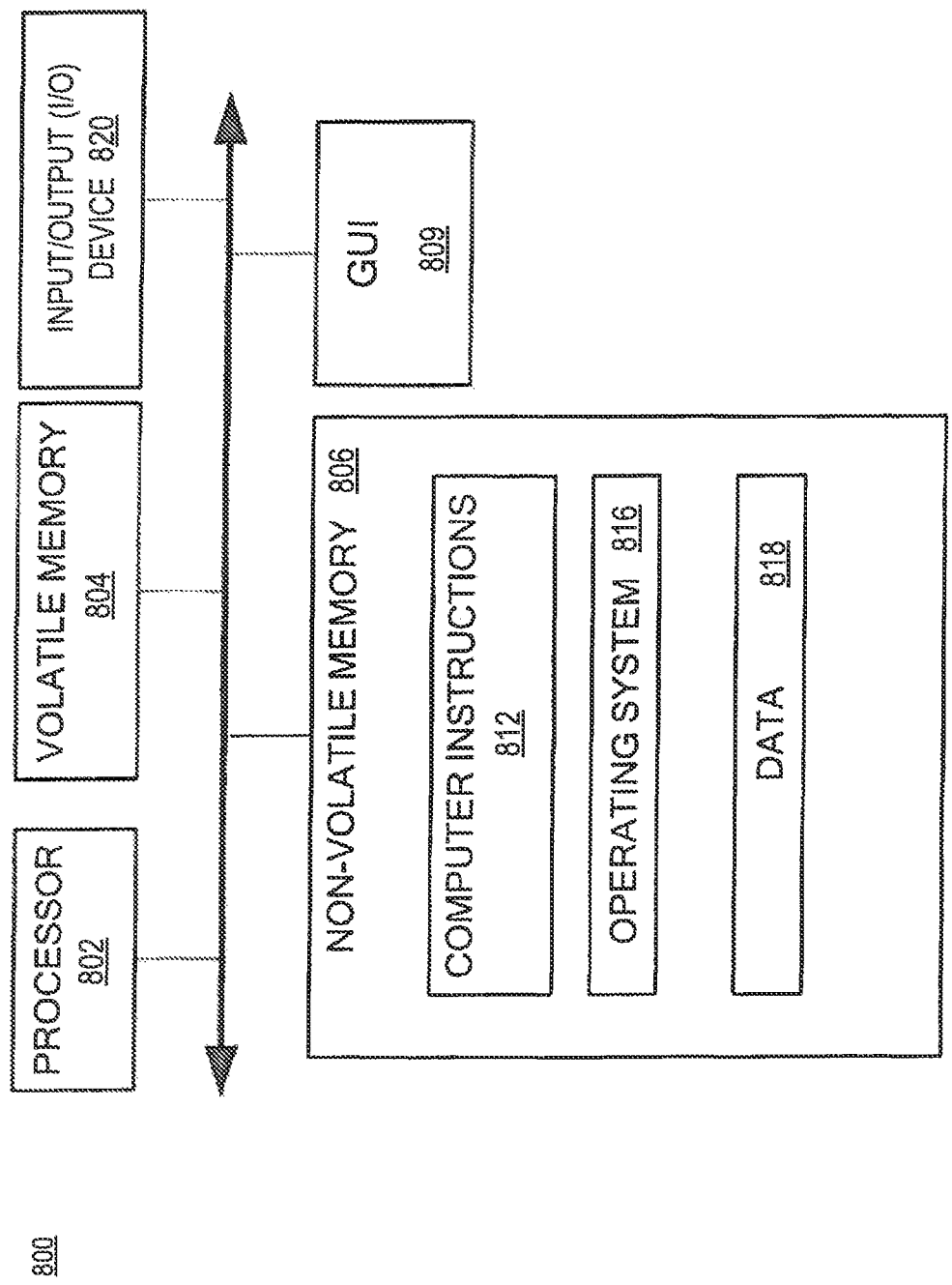
FIG. 8 is a flowchart of an example of a computing device, according to aspects of the disclosure.

FIG. 1A is a diagram of an example of a system 100, according to aspects of the disclosure. The system 100 includes a storage system 110 that is operatively coupled to a host system 120. The storage system 110 may be a content-addressable storage system, and it may include a storage array 112. The storage array 112 may include a plurality of solid-state drives (SSDs) that are configured to store data that is received from the host system 120. The host system 120 may include any suitable type of computing device, such as the computing device 800, which is shown in FIG. 8. The host system 120 may be configured to execute a file system 122. The file system 122 may be configured to access a volume 114 that is implemented on the storage array 112. As illustrated in FIG. 1B, the file system 122 may include a plurality of blocks 126, that are each 4 KB in size. By contrast, as illustrated in FIG. 1C, the storage system 110 may include a plurality of deduplication chunks 118, that are each 16 KB in size. Because the size of the deduplication chunks automatically translates to the amount of metadata (e.g., hash digests of data chunks, etc.) needed to be managed by the storage system 110, the size of the duplication chunks 118 is selected to be large enough so as to allow a net gain of storage space, when the maintenance of metadata is taken into account.

When a file (e.g., file 200, shown in FIG. 2) is stored in the storage system 110, the contents of multiple file system blocks 126 may be grouped together to form data chunks 118, which are subsequently deduplicated by the storage system. According to the present disclosure, the term "data deduplication" may refer to any suitable technique for eliminating duplicate copies of repeating data in the storage system 110. In some implementations, when data deduplication is performed, a hash digest of a first data item may be compared to the hash digest of a second data item. The first data item may be one that is associated with a write request received at the storage system 110 (i.e., a data item that is requested to be written to the storage array 112). And the second data item may be one that is already stored on the storage array 112. If the hash digests of the first data item and the second data item match, this may indicate that the two data items are identical. In such instances, instead of storing a second copy of the same data item, the storage system 110 may service the write request by generating new metadata that points to the location where the earlier copy of the data item is stored.

In some implementations, the metadata may include: (i) an address-to-hash mapping, and (ii) a hash-to-physical-location mapping. The address-to-hash mapping may map a given offset (e.g., a logical block address) where the first data item is requested to be stored to the hash digest of the first data item. The hash-to-physical-location mapping may map the hash digest of the first data item to the physical location where a copy of the data item is already stored. After they are generated, the address-to-hash mapping and the hash-to-physical-address mapping may be used to retrieve the already-stored copy of the data item, in a well-known fashion, when a read request is received at the storage system for the given offset.

As noted above, the storage system 110 is a content-addressable storage system, which is to be distinguished from location-addressable storage systems. According to aspects of the disclosure, a content-addressable storage system may include any suitable type of storage system that performs deduplication and uses content-based addressing to store data. By contrast, a location-addressable storage system may include any suitable type of storage system that uses location-based addressing to store data. When content-based addressing is used to store data, the physical location on the physical medium where the data is stored is selected, at least in part, based on the content of the data. As discussed above, content-based addressing may include generating a hash digest for data and subsequently using the hash-digest to store and retrieve the data from one or more storage devices that are part of a storage system. On the other hand, when location-based addressing is used, the physical location where the data is stored is selected based on a provided offset, rather than on the data's contents. Further information about methods for performing content-based addressing and location-based addressing can be found in U.S. patent application Ser. No. 16/261,174 titled "SUB-LUN NON-DEDUPLICATED TIER IN A CAS STORAGE TO REDUCE MAPPING INFORMATION AND IMPROVE MEMORY EFFICIENCY," which is herein incorporated by reference.

Figures 1D, 2:
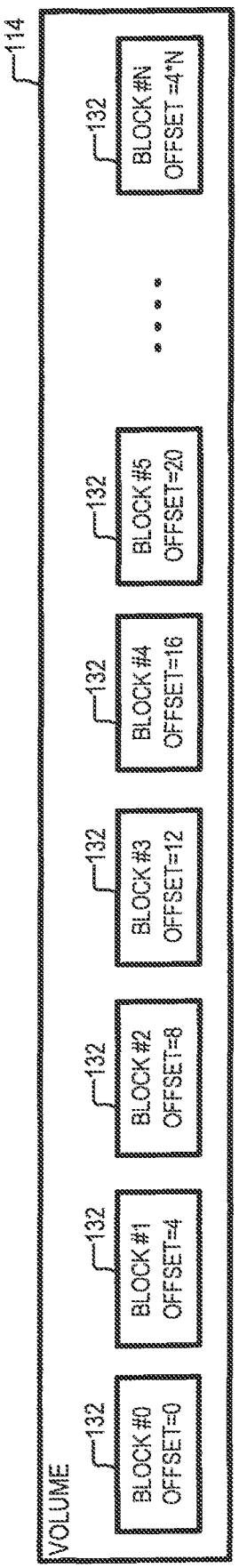
FIG. 1D is a diagram of an example of a volume, according to aspects of the disclosure.
FIG. 2 is a diagram of an example of a file, according to aspects of the disclosure.

FIG. 1D shows volume 114 in further detail. As illustrated, volume 114 may include a plurality of blocks 132. Each of the blocks 132 may represent a respective logical division of volume 114 that is situated at a corresponding offset in volume 114. According to the present example, each of the blocks 132 is 4 KB in size. According to the present example, each of the chunks 118 is associated with a different set of four consecutive blocks 132, such that none of the blocks 132 is associated with more than one chunk 118. More particularly, in some implementations, the i-th chunk 118 in the storage system 110 may be associated with blocks [i*4] through [i*4+3], where is an integer greater than or equal to 0. Under this arrangement, the first chunk 118 in the storage system 110 may be associated with the first four blocks 132 in volume 114, the second chunk 118 in volume 114 may be associated with the next four blocks 132 in volume 114, and so forth. As a result of this arrangement, the contents of each group of four consecutive blocks 132 (starting at offset 0) may be deduplicated together by the storage system 110.

FIG. 2 shows an example of a file 200, according to aspects of the disclosure. As illustrated, the file 200 may include a plurality of file blocks 210. When a copy of the file 200 is stored in volume 114, each of the file blocks 210 is mapped to a different respective file system block 126. Each file system block 126 is then mapped to a corresponding volume block 132. And each volume block 132 is mapped to a corresponding physical location on one of the storage devices that make up the storage array 112. As noted above, because the storage system 110 is a content-addressable storage system, multiple volume blocks can be mapped to the same physical location on a particular storage device by using respective address-to-hash and hash-to-physical-location mappings. As used throughout the disclosure, the terms "file block" and "file system block" are used interchangeably because each of the file blocks 210 is mapped to a different respective one of the file system blocks 126, and is the same size as the respective file system block 126.

According to the present example, the file blocks 210 are each 4 KB in size, and each of the file blocks 210 constitutes a different portion of the file 200. Specifically, the file block 210A may include the first 4 KB of the file 200, the file block 210B may include the second 4 KB of the file 200, the file block 210C may include the third 4 KB of the file 200, the file block 210D may include the fourth 4 KB of the file 200, the file block 210E may include the fifth 4 KB of the file 200, the file block 210F may include the sixth 4 KB of the file 200, the file block 210G may include the sixth 4 KB of the file 200 and the file block 210H may include the eight block 4 KB of the file 200. As illustrated, the blocks 210 are positioned in a specific order within the file 200. Specifically, the file block 210A is positioned first in the file, the file block 210B is positioned second within the file 200, the file block 210C is positioned third within the file 200, the file block 210D is positioned fourth within the file, the file block 210E is positioned fifth within the file 200, the file block 210F is positioned sixth within the file 200, the file block 210G is positioned seventh within the file 200, and the file block 210H is positioned eight within the file 200.

Figure 3A:
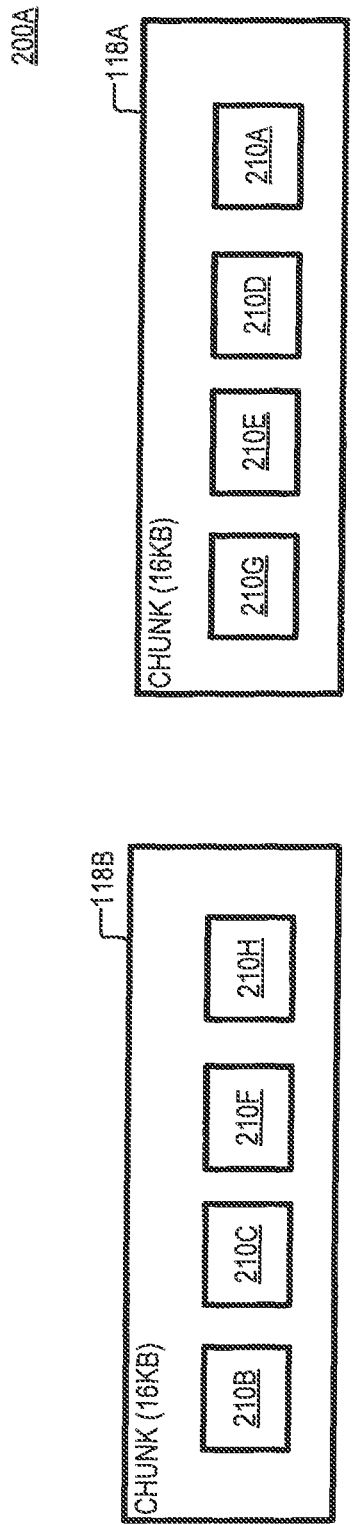
FIG. 3A is a diagram of an example of a file copy, according to aspects of the disclosure.
Figure 3B:
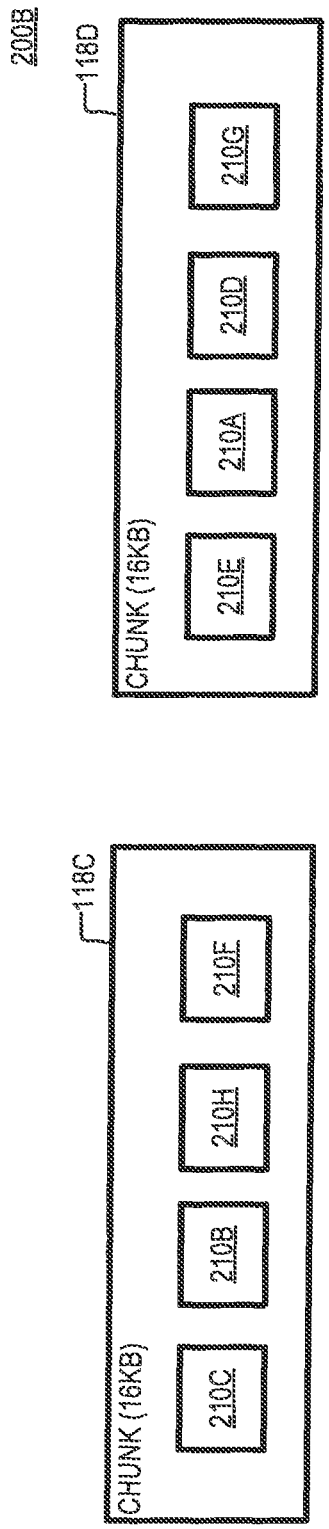
FIG. 3B is a diagram of an example of another file copy, according to aspects of the disclosure.

The order in which the file blocks 210 are stored on the storage array 112 may affect how well is the file 200 deduplicated by the storage system 110. In this regard, FIGS. 3A-B show an example of two different copies of the file 200 (i.e., file copies 200A and 200B) that cannot be deduplicated by the storage system 110 because the file blocks 210 are stored in a different order in each copy. According to the present example, file copy 200A is stored in chunks 118A and 118B and file copy 200B is stored in chunks 118C and 118D. As used throughout the disclosure, a file copy (or portion thereof) is considered to be stored in a particular chunk 118 when the file copy (or portion thereof) is written to the one or more offsets (e.g., logical block addresses) that are associated with the chunk.

According to the example of FIGS. 3A-B, chunks 118B and 118C contain the same set of blocks 210. However, the blocks 210 in each of the chunks 118B and 118C are arranged in a different order, which in turn results in the chunks 118B and 118C having different hash digests. As can be readily appreciated, when the chunks 118B and 118C have different hash digests, they would not be deduplicated by the storage system 110 when their contents are written to physical storage. Similarly, chunks 118A and 118D contain the same set of blocks 210. However, the blocks 210 in each of the chunks 118A and 118D are arranged in a different order, which in turn results in the chunks 118A and 118D having different hash digests. As can be readily appreciated, when the chunks 118A and 118D have different hash digests, they would not be deduplicated by the storage system 110 when their contents are written to physical storage.

Figure 4A:
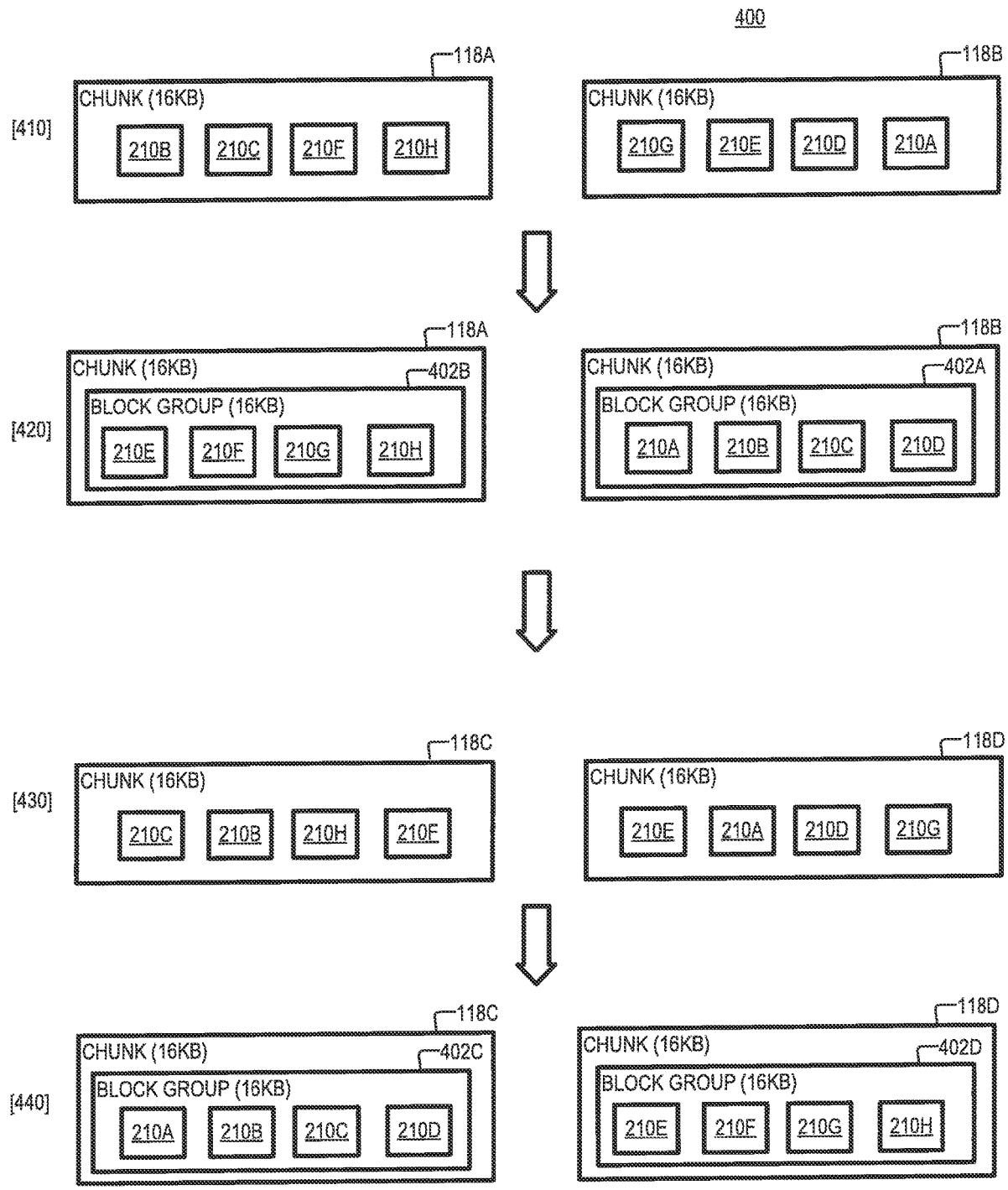
FIG. 4A is a diagram illustrating the operation of a process for defragmentation, according to aspects of the disclosure.

FIG. 4A shows an example of a defragmentation process 400, which can be used to improve the rate at which file copies 200A and 200B are deduplicated by the storage system 110. At stage 410, file copy 200A is retrieved from the storage array 112 and a plurality file blocks 210 that make up the file copy 200A is identified. At stage 420, the file blocks 210 of the file copy 200A are arranged in groups 402A and 402B. As illustrated, the file blocks 210 in each of the groups 402A and 402B are arranged in the order in which the file blocks 210 occur in the file 200, and the combined size of the file blocks in each of the groups 402A and 402B is equal to the size of the chunks 118A and 118B. After file blocks 210 are arranged in the groups 402A and 402B, group 402A is aligned with chunk 118B, and group 402B is aligned with chunk 118A.

Aligning group 402A with chunk 118B may include writing each of the blocks 210 in group 402A to a different one of the offsets (e.g., logical block addresses) that are associated with the chunk 1188B, such that the blocks 210 are written to the chunk 118B in the order in which they occur within the file 200. In accordance with this arrangement: the first block in the group 402A (i.e., the block in the group 402A that is located the closest to the beginning of the file 200 among all blocks in the group 402A) is written to the first offset in the set of offsets that are associated with the chunk 118B (i.e., the smallest offset among all offsets that are associated with the chunk 118B); the second block 210 in the group 402A is written to the second smallest offset in the chunk 118B; the third block 210 in the group 402A is written to the third smallest offset in the chunk 118B; and the last block in the group 402A (i.e., the block in the group 402A that is located the furthest away to the beginning of the file 200 among all blocks in the group 402A) is written to the last offset in the set of offsets that are associated with the chunk 118B (i.e., the largest offset among all offsets that are associated with the chunk 118B).

Aligning group 402B with chunk 118A may include writing each of the blocks 210 in group 402B to a different one of the offsets (e.g., logical block addresses) that are associated with the chunk 118A, such that the blocks 210 are written to the chunk 118A in the order in which they occur within the file 200. In accordance with this arrangement: the first block in the group 402B (i.e., the block in the group 402B that is located the closest to the beginning of the file 200 among all blocks in the group 402B) is written to the first offset in the set of offsets that are associated with the chunk 118A (i.e., the smallest offset among all offsets that are associated with the chunk 118A); the second block 210 in the group 402B is written to the second smallest offset in the chunk 118A; the third block 210 in the group 402B is written to the third smallest offset in the chunk 118A; and the last block in the group 402B (i.e., the block in the group 402B that is located the furthest away to the beginning of the file 200 among all blocks in the group 402B) is written to the last offset in the set of offsets that are associated with the chunk 118A (i.e., the largest offset among all offsets that are associated with the chunk 118A).

At stage 430, file copy 200B is retrieved from the storage array 112 and a plurality file blocks 210 that make up the file copy 200B is identified. At stage 440, the file blocks 210 of the file copy 200B are arranged in groups 402C and 402D. As illustrated, the file blocks 210 in each of the groups 402C and 402D are arranged in the order in which the file blocks 210 occur in the file 200, and the combined size of the file blocks in each of the groups 402C and 402D is equal to the size of the chunks 118C and 118D. After file block 210 are arranged in the groups 402C and 402D, group 402C is aligned with chunk 118C, and group 402D is aligned with chunk 118D.

The alignment of groups 402C and 402D may be performed in the same manner as discussed with respect to groups 402A and 402C. However, when each of groups 402C and 402D is written to the storage system 110, the contents of each of the groups 402C and 402D will be deduplicated. Specifically, because group 402C is identical to group 402A, chunk 118C will be deduplicated when its content is written to the storage array 112. As a result of the deduplication, instead of storing a second copy of the contents of groups 402A/C, the storage system 110 may only generate metadata that maps the offsets (e.g., logical block addresses) associated with chunk 118C to the physical location where the contents of chunk 118B was stored at stage 420. Furthermore, because group 402D is identical to group 402B, chunk 118D will be deduplicated when its content is written to the storage array 112. As a result of the deduplication, instead of storing a second copy of the contents of groups 402B/D, the storage system 110 may only generate metadata that maps the offsets (e.g., logical block addresses) associated with chunk 118D to the physical location where the contents of chunk 118A was stored at stage 420.

Figure 4B:
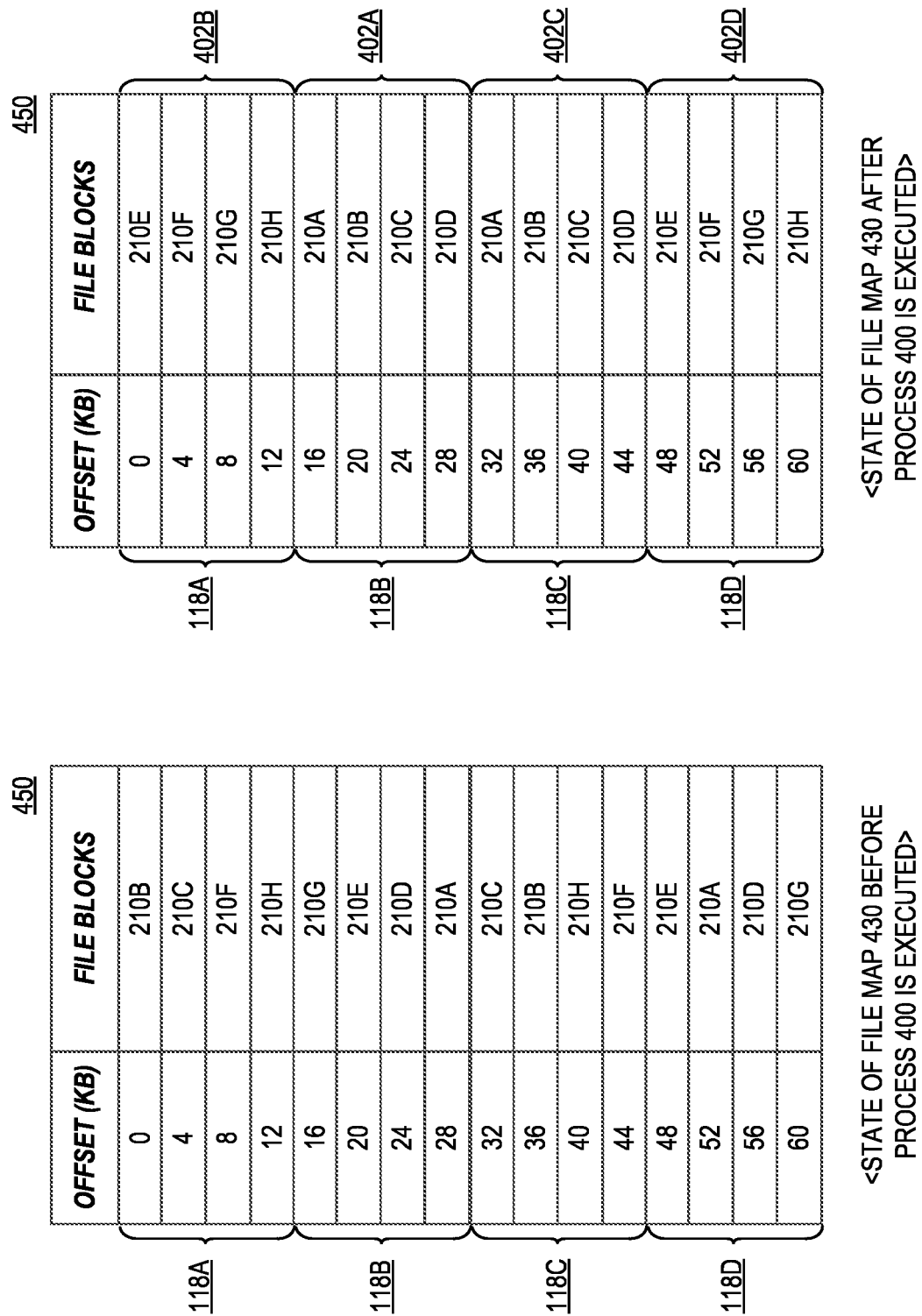
FIG. 4B is a diagram illustrating an example of a file map, according to aspects of the disclosure.

FIG. 4B shows an example of a file map 450 before and after the process of FIG. 4A is performed. Although the file map 450 is depicted as a table, it will be understood that the file map 450 may include any suitable type of data structure that is used by the file system 122 to map file system blocks 126 (and/or file blocks) to offset values (e.g., logical block addresses) in volume 114. Although in the present example, file map 450 includes only entries that correspond to file copies 200A and 200B, it will be understood that alternative implementations are possible in which other files are identified in the file map 450. Although in the present example, each of the chunks 118A-D includes only portions of the same file copy (or file) before the process 400 is executed, it will be understood that alternative implementations are possible in which, before the process 400 is executed, any of the chunks 118A-D includes portions that belong to different files. Although in the present example, after the process 400 is executed, file copy 200A (and/or the file copy 200B) is stored in the same chunks 118 as before the execution of the process 400, alternative implementations are possible in which at least a portion of the file copy 200A (and/or the file copy 200B) is moved to another chunk 118 when the process 400 is executed. Moving at least a portion of the file copy 200A (or file copy 200B) to another chunk may include deleting the portion from the former chunk and copying the portion to the latter chunk.

FIG. 4B illustrates that executing the process 400 results in a change in the order in which the blocks 210 of file copies 200A and 200B are arranged in volume 114. As illustrated, the blocks of each of the file copies 200A and 200B are arranged in groups 402, such that: (i) the combined size of the blocks 210 in each group 402 is equal to the deduplication chunk size of the storage system 110 (i.e., the size of any of chunks 118), and (ii) the blocks in each group 402 are aligned with a different one of the chunks 118A-D. As illustrated, aligning the blocks in any of the groups 402 with the group's respective chunk 118 results in the blocks being stored within the chunk 118 in the order in which they occur within the file 200. According to the present example, the size of the file 200 is a multiple of the deduplication chunk size of the storage system 110. However, alternative implementations are possible in which this is not the case. In such implementations, the combined size of the last group of blocks 210 in the file copy 200A (i.e., group 402A) may be less than the size of its receiving chunk 118 (e.g., chunk 118B). In such instances, the remaining space in the receiving chunk may be padded (e.g., with one's or zeros). Similarly, the combined size of the last group of blocks 210 in the file copy 200B (i.e., group 402D) may be less than the size of its receiving chunk (e.g., chunk 118D). In such instances, the remaining space in the receiving chunk may be padded (e.g., with one's or zeros), to ensure that the receiving chunk of the last group of blocks 210 of the file copy 200B will be deduplicated with the receiving chunk of the last group of blocks 210 of the file copy 200A. Alternatively, in some implementations, the receiving chunks of the last groups of blocks may not be padded and used instead to store additional data, in which case the last groups of file blocks 210 in the file copies 200A and 200B will not be deduplicated.

In some respects, FIG. 4B illustrates that the file blocks 210 in each of the chunks 118 may be stored in the order in which they occur within the file 200 (e.g., see file blocks 210A and 210B in chunk 118B). According to the present disclosure, two file blocks 210 are stored in the order in which they occur within the file 200 when the file block 210 that has a lower position within the file 200 (i.e., position that is closer to the beginning of the file) is stored at a smaller offset than the other file block 210.

In some respects, FIG. 4B illustrates that the file blocks 210 that are situated in different chunks 118 may be stored in an order that is different from the order in which they occur within the file 200 (e.g., see file blocks 210A and 210E in chunks 118B and 118A, respectively). According to the present disclosure, two file blocks 210 are stored in an order that is different from the order in which they occur within the file 200 when the file block 210 that has a lower position within the file 200 is stored at a larger offset than the other file block 210.

Figure 4C:
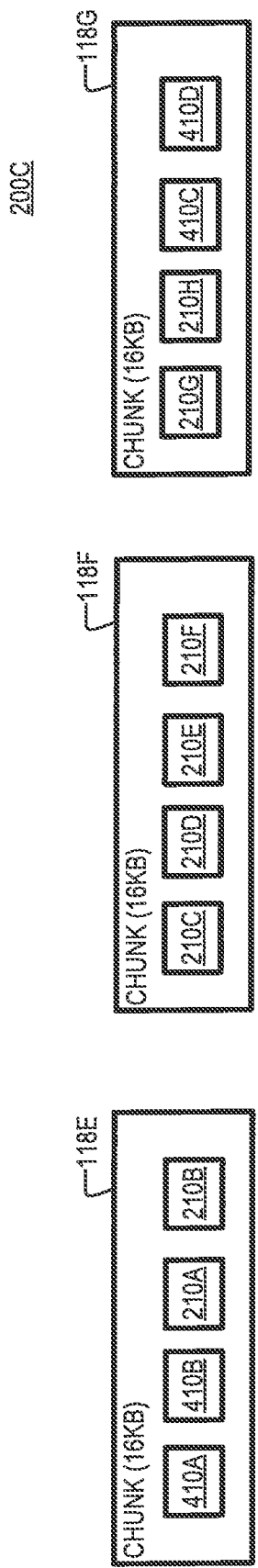
FIG. 4C is a diagram of an example of a file copy before the file copy is defragmented, according to aspects of the disclosure.
Figure 4D:
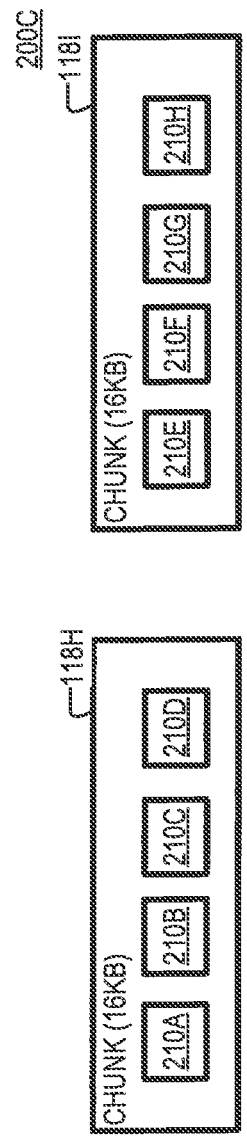
FIG. 4D is a diagram of the file copy of FIG. 4C after the file copy is defragmented, according to aspects of the disclosure.

FIGS. 4C-D illustrate an example of a copy 200C of the file 200 before and after the copy 200C is defragmented. As illustrated in FIG. 4C, before defragmentation is performed, the copy 200C of the file 120 is stored in chunks 118E, 118F, and 118G, and the blocks 210 are arranged in the chunks 118E-G in the order in which they occur in the file 200 (i.e., a sequential order). Furthermore, the blocks 210 are stored together with blocks 410A-D, which belong to one or more other files that are part of the file system 122. After the file copy 200C is defragmented, the file blocks 210 are copied to and aligned with chunks 118H and 118I. As illustrated, in FIG. 4D, when the file blocks 210 of the copy 200C are aligned with chunks 118H and 118I, the first block in the file 200 (i.e., the block 210A) is copied to an offset, which is a multiple of the deduplication chunk size, and all remaining blocks 210 are stored in sequence after the first block in the file 200. As a result of this arrangement, the n-th block 210 of the file 200 is stored at an offset that is equal to a+n*b, where a is the offset at which the first block in the file 200 is stored, n is an integer greater than 1 and less than or equal to the total count of blocks in the file 200, and b is the size of each of the blocks 210.

Figure 5:
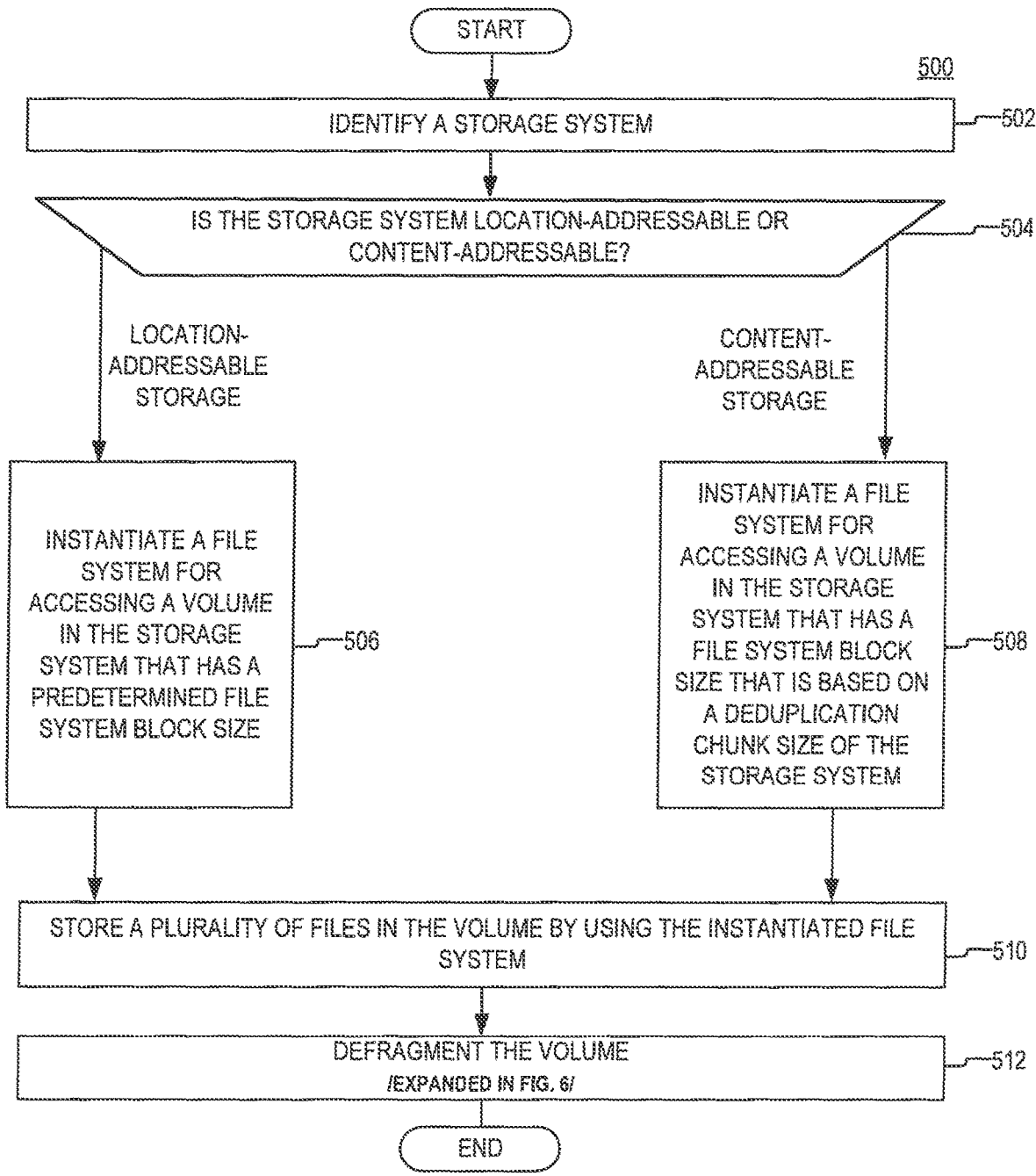
FIG. 5 is a flowchart of an example of a process, according to aspects of the disclosure.

FIG. 5 is a flowchart of an example of a process 500, according to aspects of the disclosure. The process 500 may be executed by a host system, such as the host system 120, and/or any other suitable type of computing device. At step 502, a storage system is identified. At step 504, the type of the storage system is identified. If the storage system is a location-addressable storage system, the process 500 proceeds to step 506. Otherwise, if the storage system is a content-addressable storage system, the process 500 proceeds to step 508. At step 506, a new file system is instantiated that has a predetermined file system block size (e.g., 1 KB, 3 KB, etc.). At step 508, a new file system is instantiated that has a file system block size that is set dynamically based the deduplication chunk size of the storage system. According to the present example, at step 508, the file system block size is dynamically selected such that it is a factor of the deduplication chunk size of the storage system. Setting the file system block in this manner may permit the efficient execution of the defragmentation processes discussed with respect to FIGS. 4A-B and FIG. 7. At step 510, a plurality of files is stored in the storage system. At step 512, the storage system is defragmented. In some implementations, the storage system may be defragmented by executing the process 400, which is discussed above with respect to FIGS. 4A-B. Additionally or alternatively, in some implementations, the storage system may be defragmented by executing any of processes 600 and 700, which are discussed further below with respect to FIGS. 6 and 7, respectively.

According to aspects of the disclosure, the host system executing the process 500 may identify the type of the storage system by retrieving, from a memory, a file that identifies the manufacturer of the storage system and/or other information associated with the storage system that is indicative of the storage system's type. Additionally or alternatively, in some implementations, the host system may determine the type of the storage system by executing a handshake with the storage system, which involves the host system transmitting to the storage system a request asking the storage system to identify its type and receiving at the host system a response from the storage system that includes an indication of the type of the storage system.

Figure 6:
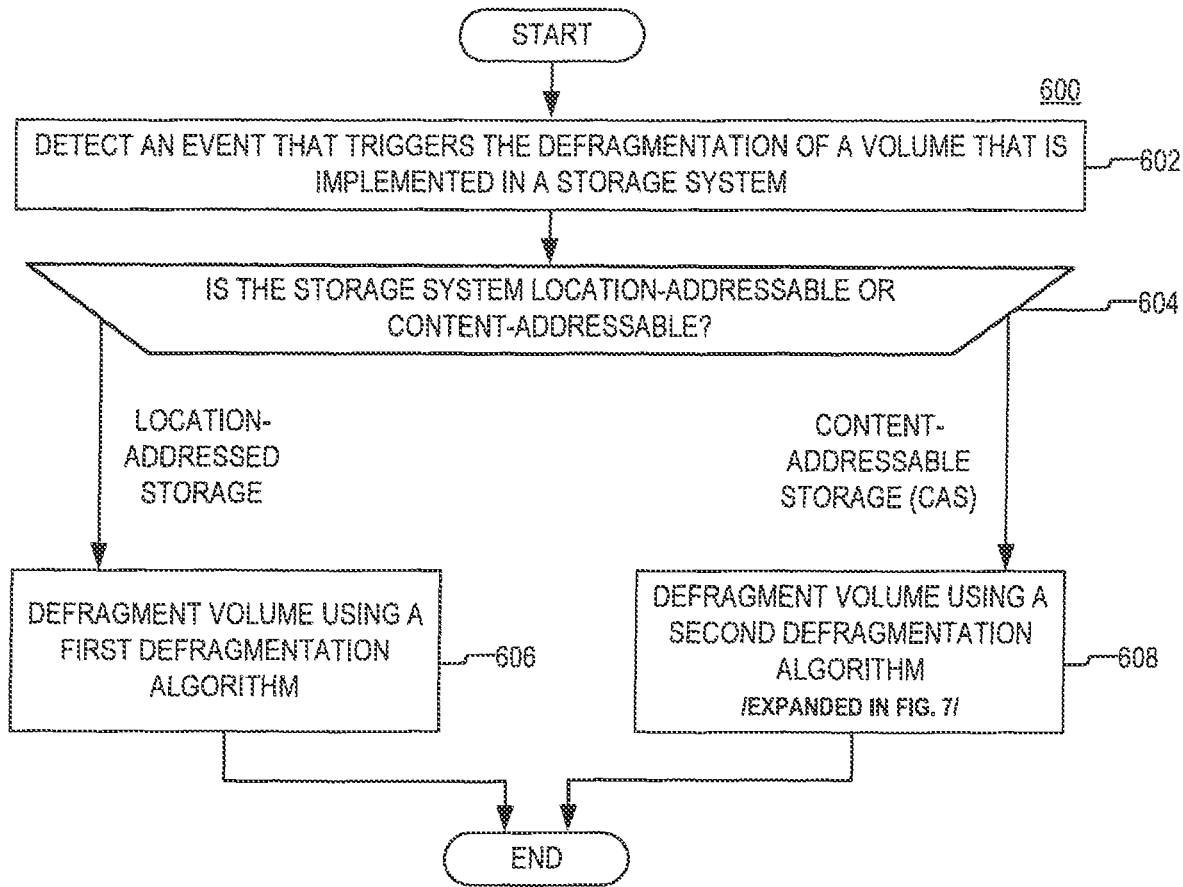
FIG. 6 is a flowchart of an example of a process, according to aspects of the disclosure.

FIG. 6 is a flowchart of an example of a process 600, according to aspects of the disclosure. The process 600 may be performed by a defragmentation process/utility that is executed on a host system, such as the host system 120. At step 602, an event is detected that triggers the defragmentation of a volume that is implemented in a storage system. The event may include any suitable type of event, such as an event that is generated when a particular input action is performed or an event that is generated when a timer expires. At step 604, the type of the storage system is determined. If the storage system is a location addressable storage system, the process 600 proceeds to step 606. Otherwise, if the storage system is a content-addressable storage system, the process 600 proceeds to step 608. At step 606, the storage system is defragmented in accordance with a first defragmentation algorithm. The first defragmentation algorithm may include any suitable type of algorithm that is known in the art, which can be used to defragment location-addressable storage systems. At step 608, the storage system is defragmented in accordance with a second defragmentation algorithm that is different from the first defragmentation algorithm. In some implementations, the second defragmentation algorithm may be one that is optimized for content-addressable storage systems. Additionally or alternatively, in some implementations, the second defragmentation algorithm may be the same or similar to the algorithm that is implemented by the process 400 and/or the process 700.

Figure 7:
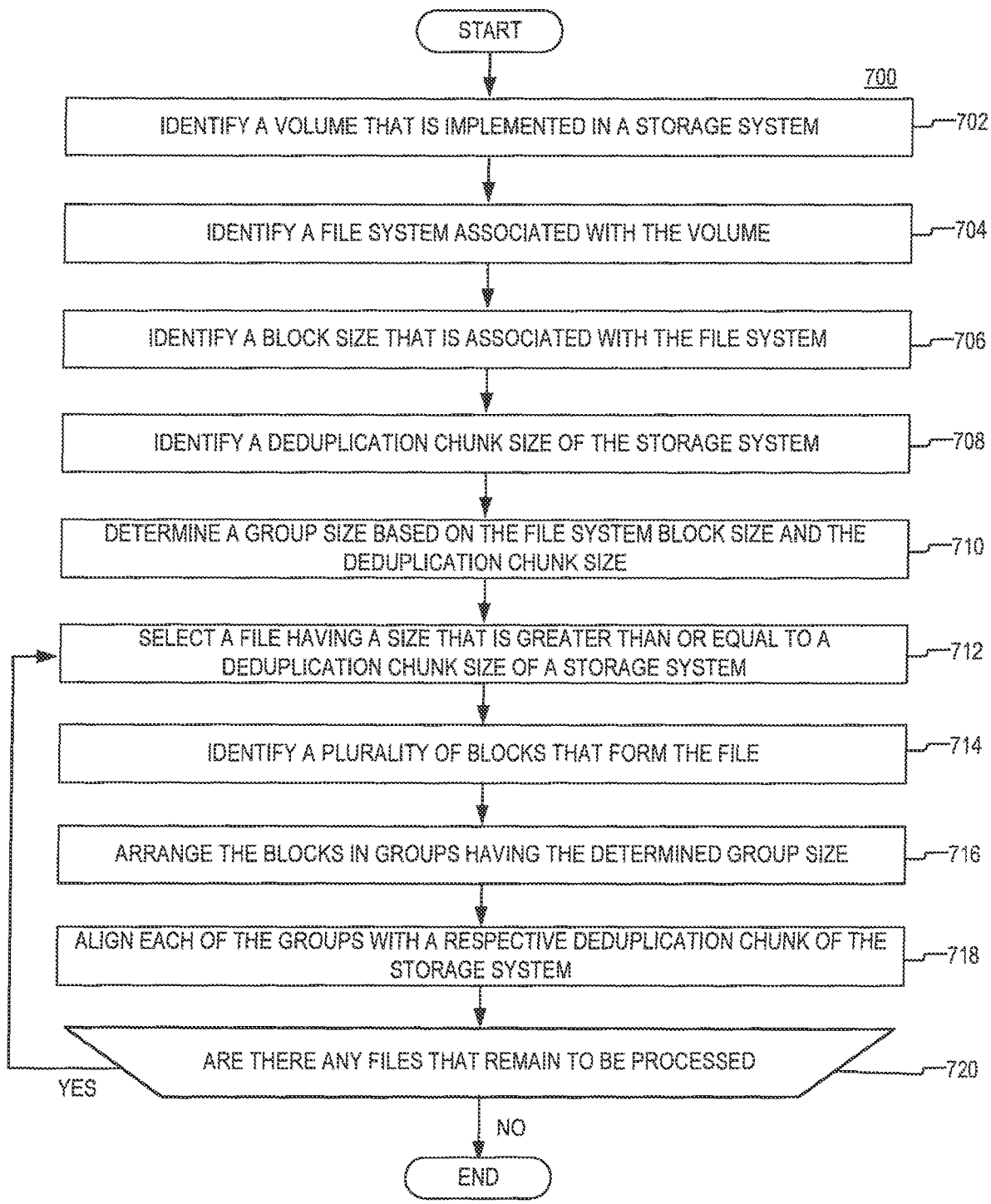
FIG. 7 is a flowchart of an example of a process, according to aspects of the disclosure.

FIG. 7 is a flowchart of an example of a process 700, according to aspects of the disclosure. The process 700 may be performed by a defragmentation process/utility that is executed on a host system, such as the host system 120.

At step 702, a volume in a content-addressable storage system is identified. At step 704, a file system associated with the volume is identified. At step 706, a file system block size of the file system is identified. At step 708, a deduplication chunk size of the storage system is identified. The deduplication chunk size of the storage system may be the size of all (or at least some) of the deduplication chunks that are part of the storage system. At step 710, a group size is determined based on the file system block size and the deduplication chunk size of the storage system. According to the present example, the group size is determined by dividing the deduplication chunk size by the file system block size. At step 712, one of the files in the file system is selected. In some implementations, the selected file may be one whose size is greater than or equal to the deduplication chunk size of the storage system. In some implementations, the file may be the same or similar to the file copy 200A, which is discussed above with respect to FIG. 4A. At step 714, a plurality of file blocks that make up the selected file is identified. The plurality may include all blocks that make up the file or only some of the blocks that make up the file. In some implementations, each of the blocks in the plurality may be the same or similar to any of the blocks 210. At step 716, the blocks in the plurality are arranged in groups. In some implementations, each of the groups may include a set of consecutive blocks from the file. In some implementations, the count of blocks in each group may be equal to the group size determined at step 708, and the combined size of the blocks in the group may match the deduplication chunk size of the storage system. At step 718, each of the block groups is aligned with a different deduplication chunk of the storage system. At step 720, a determination is made if there are any other files in the file system that remain to be processed. If there are files that remain to be processed, the process 700 returns to step 712, and another file is selected. Otherwise, if there are no more files that remain to be processed, the process 700 ends.

According to the present example, the combined size of the file blocks in a group matches the deduplication chunk size of the storage system when the combined size is equal to the deduplication chunk size. However, alternative implementations are possible in which the combined size matches the deduplication chunk size when the combined size and the deduplication chunk size are within a predetermined distance from one another.

According to the present example, aligning a group of file blocks with a deduplication chunk may include writing each of the file blocks to a different offset (e.g., logical block address) that is associated with the deduplication chunk, such that the file blocks in the group are written in a standardized order that is based on the order in which the file blocks occur within the file. As discussed above with respect to FIGS. 4A-B, the standardized order may be the same as the order in which the file blocks occur within the file. However, alternative implementations are possible in which another order is used, such as one that is the reverse of (or otherwise different from) the order in which the file blocks occur within the file.

According to the present example, each of the groups determined at step 716 includes a set of consecutive file blocks. However alternative implementations are possible in which any of the groups determined at step 716 may include non-consecutive blocks, as long as the blocks are selected for inclusion in the group based on the order in which the blocks occur in the file. As can be readily appreciated, the process 700 may operate to remove duplicative copies of the same file, for as long as the files' blocks are grouped in a predictable manner that results in the same data chunks being generated for each copy of the file.

In some implementations, aligning a group of file blocks with a deduplication chunk may include moving one or more of the file blocks from one physical location in the storage system to another physical location in the storage system. Additionally or alternatively, in some implementations, aligning a group of file blocks with a deduplication chunk may include modifying a file map associated with the file, as discussed above with respect to FIG. 4B.

FIG. 8 is a diagram of an example of a computing device 800, according to aspects of the disclosure. Computing device 800 may include processor 802, volatile memory 804 (e.g., RAM), non-volatile memory 806 (e.g., a hard disk drive, a solid state drive such as a flash drive, a hybrid magnetic and solid state drive, etc.), graphical user interface (GUI) 809 (e.g., a touchscreen, a display, and so forth) and input/output (I/O) device 820 (e.g., a mouse, a keyboard, etc.). Non-volatile memory 806 stores computer instructions 812, an operating system 816 and data 818 such that, for example, the computer instructions 812 are executed by the processor 802 out of volatile memory 804. Program code may be applied to data entered using an input device of GUI 809 or received from I/O device 820.

FIGS. 1-8 are provided as an example only. It will be understood that the defragmentation processes discussed with respect to FIGS. 4, 6, and 7 do not require changing the block size of the file system on which the defragmentation processes are executed. Although in the example of FIG. 5 the file system block size of content-addressable storage systems is selected based on the storage system's deduplication chunk size, the defragmentation processes discussed with respect to FIGS. 4, 6, and/or 7 are not limited to any specific file system block size and/or file system. Furthermore, it will be understood that the defragmentation process discussed with respect to FIG. 7 can be executed independently of the processes discussed with respect to FIGS. 5 and 6. Stated succinctly, the present disclosure is not limited to any specific implementation of the ideas and concepts described with respect to FIGS. 1-8.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation." Although in the example of FIGS. 1A-8 the file system block size of the host device 120 is 4 KB, it will be understood that the present disclosure is not limited to any specific file system block size. Although in the example of FIGS. 1A-8 the deduplication chunk size of the storage system 110 is 16 KB, it will be understood that the present disclosure is not limited to any specific deduplication chunk size. Although in the example of FIG. 1A, the storage array 112 includes SSDs, it will be understood that alternative implementations are possible in which the storage array 112 includes other types of storage devices, such as spin disks and non-volatile RAM, etc.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A system comprising:
   a memory; and
   at least one processor that is operatively coupled to the memory, the at least one processor being configured to perform the operations of:
   selecting a file that is stored in a storage system, the file including a plurality of file system blocks;
   arranging the plurality of file system blocks in block groups, the file system blocks in each block group being arranged in an order that is the same as an order in which the file system blocks occur in the selected file, each of the block groups, except for a last one of the block groups, consisting of a different first set of file system blocks, the file system blocks in each first set having a same first combined size, the first combined size being equal to a deduplication chunk size of the storage system; and
   writing the file system blocks, in each of the block groups, to respective volume offsets that correspond to a same receiving deduplication chunk of the storage system, wherein writing the file system blocks in the block groups to respective volume offsets that correspond to the same receiving deduplication chunk causes each of the block groups to be stored in the storage system based on a mapping between a hash digest of the block group and a corresponding physical address, wherein the deduplication chunk size of the storage system specifies an amount of data that is used to calculate each of the hash digests, wherein the last one of the block groups includes a second set of file system blocks having a second combined size, the second combined size being smaller than the deduplication chunk size of the storage system, the second set of file system blocks including file system blocks that fall at an end of the selected file; and wherein writing the file system blocks in each of the block groups to respective volume offsets that correspond to a same receiving deduplication chunk includes padding a receiving deduplication chunk of the last one of the block groups.

2. The system of claim 1, wherein the block groups are stored in non-consecutive sections of the storage system, the file is part of a file system having a file system block size that is a factor of the deduplication chunk size of the storage system.

3. The system of claim 1, wherein at least some file system blocks that are part of different block groups are stored in the storage system in an order that is different from the order in which the file system blocks occur in the selected file.

4. The system of claim 1, wherein the file is part of a file system, and arranging the plurality of file system blocks in block groups includes:
   detecting a block size of the file system;
   detecting the deduplication chunk size of the storage system; and
   calculating a desired count of file system blocks in each of the block groups based on the block size of the file system and the deduplication chunk size of the storage system.

5. The system of claim 1, wherein each of the block groups includes a respective first file system block, and the respective first file system block of each of the block groups is stored at a volume offset that is a multiple of the deduplication chunk size of the storage system.

6. A non-transitory computer-readable medium storing one or more processor-executable instructions, which when executed by at least one processor cause the at least one processor to perform the operations of:
   selecting a file that is stored in a storage system, the file including a plurality of file system blocks;
   arranging the plurality of file system blocks in block groups, the file system blocks in each block group being arranged in an order that is based on an order in which the file system blocks occur in the selected file, each of the block groups, other than a last one of the block groups, consisting of a different first set of consecutive file system blocks, the file system blocks in each first set having a same first combined size, the first combined size being equal to a deduplication chunk size of the storage system; and
   writing the file system blocks in each of the block groups to respective volume offsets that correspond to a same receiving deduplication chunk of the storage system, wherein writing the file system blocks in each of the block groups to respective volume offsets that correspond to the same receiving deduplication chunk causes each of the block groups, other than the last one of the block groups, to be stored in the storage system based on a mapping between a hash digest of the block group and a corresponding physical address, wherein the storage system is arranged to store data based on hash digests of the data, and the deduplication chunk size of the storage system specifies an amount of data that is used to calculate each of the hash digests, wherein the last one of the block groups includes a second set of file system blocks having a second combined size, the second combined size being smaller than the deduplication chunk size of the storage system; and wherein writing the file system blocks in each of the block groups to respective volume offsets that correspond to a same receiving deduplication chunk includes padding a receiving deduplication chunk of the last one of the block groups.

7. The non-transitory computer-readable medium of claim 6, wherein the file system blocks are arranged in the block groups in the order in which they occur in the selected file, and the last one of the block groups includes file system blocks that fall at an end of the selected file.

8. The non-transitory computer-readable medium of claim 6, wherein the block groups are stored in non-consecutive sections of the storage system.

9. The non-transitory computer-readable medium of claim 6, wherein at least some file system blocks that are part of different block groups are stored in the storage system in an order that is different from the order in which the file system blocks occur in the selected file.

10. The non-transitory computer-readable medium of claim 6, wherein the file is part of a file system, and arranging the plurality of file system blocks in block groups includes:
    detecting a block size of the file system;
    detecting the deduplication chunk size of the storage system; and
    calculating a desired count of file system blocks in each of the block groups based on the block size of the file system and the deduplication chunk size of the storage system.

11. The non-transitory computer-readable medium of claim 6, wherein each of the block groups includes a respective first file system block, and the respective first file system block of each of the block groups is stored at a volume offset that is a multiple of the deduplication chunk size of the storage system.

12. A method, comprising:
    selecting a file that is stored in a storage system, the file including a plurality of file system blocks;
    arranging the plurality of file system blocks in block groups, the file system blocks in each block group being arranged in an order that is the same as an order in which the file system blocks occur in the selected file, each of the block groups, except for a last one of the block groups, consisting of a different first set of file system blocks, the file system blocks in each first set having a same first combined size, the first combined size being equal to a deduplication chunk size of the storage system; and
    writing the file system blocks, in each of the block groups, to respective volume offsets that correspond to a same receiving deduplication chunk of the storage system, wherein writing the file system blocks in the block groups to respective volume offsets that correspond to the same receiving deduplication chunk causes each of the block groups to be stored in the storage system based on a mapping between a hash digest of the block group and a corresponding physical address, wherein the deduplication chunk size of the storage system specifies an amount of data that is used to calculate each of the hash digests, wherein the last one of the block groups includes a second set of file system blocks having a second combined size, the second combined size being smaller than the deduplication chunk size of the storage system, the second set of file system blocks including file system blocks that fall at an end of the selected file; and wherein writing the file system blocks in each of the block groups to respective volume offsets that correspond to a same receiving deduplication chunk includes padding a receiving deduplication chunk of the last one of the block groups.

13. The method of claim 12, wherein the file system blocks are arranged in the block groups in the order in which they occur in the selected file.

14. The method of claim 12, wherein the block groups are stored in non-consecutive sections of the storage system, the file is part of a file system having a file system block size that is a factor of the deduplication chunk size of the storage system.

* * * * *